United States Patent
Li et al.

(10) Patent No.: US 12,280,280 B2
(45) Date of Patent: Apr. 22, 2025

(54) COOLING TYPE DRY POWDER FIRE EXTINGUISHING AGENT AND PREPARATION METHOD AND APPLICATION THEREOF

(71) Applicant: Civil Aviation University of China, Tianjin (CN)

(72) Inventors: Xiutao Li, Tianjin (CN); Xiaomeng Zhou, Tianjin (CN)

(73) Assignee: Civil Aviation University of China, Tianjin (CN)

( * ) Notice: Subject to any disclaimer, the term of this patent is extended or adjusted under 35 U.S.C. 154(b) by 0 days.

(21) Appl. No.: 18/674,469

(22) Filed: May 24, 2024

(65) Prior Publication Data

US 2024/0307726 A1    Sep. 19, 2024

(30) Foreign Application Priority Data

May 26, 2023  (CN) .......................... 202310605248.X

(51) Int. Cl.
| | |
|---|---|
| *A62D 1/00* | (2006.01) |
| *A62C 5/00* | (2006.01) |

(52) U.S. Cl.
CPC ............ *A62D 1/0014* (2013.01); *A62C 5/008* (2013.01)

(58) Field of Classification Search
CPC .. A62D 1/0014; A62D 1/0021; A62D 1/0035; A62C 5/008; Y02E 60/10
See application file for complete search history.

(56) References Cited

U.S. PATENT DOCUMENTS

| | | |
|---|---|---|
| 2003/0030025 A1 | 2/2003 | Bennett |
| 2013/0098639 A1 | 4/2013 | Dunster et al. |
| 2013/0195938 A1* | 8/2013 | Baran, Jr. .............. B82Y 30/00 514/629 |
| 2022/0080240 A1 | 3/2022 | Zheng et al. |

FOREIGN PATENT DOCUMENTS

| | | |
|---|---|---|
| CN | 102500086 A | 6/2012 |
| CN | 114652992 A | 6/2022 |

OTHER PUBLICATIONS

CNIPA, Notification of First Office Action for Chinese application CN202310605248.X, Jan. 31, 2024.
CNIPA, Notification to grant patent right for Chinese application CN202310605248.X, May 8, 2024.

* cited by examiner

*Primary Examiner* — Andrew J. Oyer
(74) *Attorney, Agent, or Firm* — Hemisphere Law, PLLC; Zhigang Ma

(57) ABSTRACT

The present invention discloses a cooling type dry powder fire extinguishing agent and a preparation method and application thereof, which belongs to the technical field of fire control. Through a static mixing technology, an aqueous solution and a solid hydrophobic material are dispersed and mixed efficiently to form a cooling type dry powder fire extinguishing agent. The fire extinguishing agent is a micron solid particle of the aqueous solution wrapped by the hydrophobic material microscopically, and is in a dry powder state macroscopically, which can significantly reduce the electrical conductivity of the fire extinguishing agent. Meanwhile, a field rapid preparation method is adopted, which can realize real-time preparation. The preparation method is simple and efficient. The technology can be used for fighting a battery fire, has significant cooling and anti-reignition effects and can avoid the problem of electrical conduction of a traditional water-based fire extinguishing agent.

4 Claims, No Drawings

COOLING TYPE DRY POWDER FIRE EXTINGUISHING AGENT AND PREPARATION METHOD AND APPLICATION THEREOF

TECHNICAL FIELD

The present invention relates to the technical field of fire control, in particular to a cooling type dry powder fire extinguishing agent and a preparation method and application thereof.

BACKGROUND

In recent years, fire accidents of electric vehicles and energy storage power stations caused by lithium batteries are frequent, and an efficient fire extinguishing technology is one of the key means to ensure the safe application of lithium batteries. However, because of the complexity of the lithium battery fire, it is more difficult to fight the fire, and especially lithium batteries are extremely easy to reignite and easy to lead to secondary fire, which brings great challenges to fire fighting. According to the existing research, rapid cooling of lithium batteries is an effective method to inhibit the reignition. In the existing fire extinguishing agents, water-based fire extinguishing agents (including water spray, water mist, foam extinguishing agent, etc.) have the best cooling effect, but due to the electrical conductivity of water, such fire extinguishing agents are easy to cause external short circuit of the lithium batteries and thus produce secondary disasters. Therefore, how to solve the problem of electrical conductivity of the water-based fire extinguishing agents and develop a non-conductive fire extinguishing agent with good cooling effect and strong fire extinguishing ability is the key to the prevention and control of the lithium battery fire.

SUMMARY

In order to solve the above problems, the patent of the present invention provides a rapid preparation method for a cooling type dry powder fire extinguishing agent capable of being used for a lithium battery fire. The main principle of the technology is that: an aqueous solution is dispersed into micro-particles wrapped by solid hydrophobic materials through the insoluble solid hydrophobic materials; these particles are in the state of dry powder macroscopically, and the aqueous solution is inside the dry powder particles, thereby reducing the electrical conductivity of the traditional aqueous solution fire extinguishing agent. When the fire is extinguished, the aqueous solution inside the particles volatilizes and absorbs heat, thereby producing a cooling effect. At the same time, the fire extinguishing efficiency of this fire extinguishing agent can be greatly improved by adding various high-efficiency chemical fire extinguishing components into the aqueous solution. In addition, for the problem that this fire extinguishing agent is volatile and difficult to store for a long time, the patent of the present invention adopts a field rapid preparation method, which can realize real-time preparation and preparation for immediate use, and adopts compressed gas as power, without additional electric stirring and dispersion equipment, so that the preparation method is simple and efficient.

In order to achieve the above purpose, the present invention adopts the following technical solution:

A cooling type dry powder fire extinguishing agent comprises an aqueous solution and a solid hydrophobic material; wherein a ratio of the aqueous solution and the solid hydrophobic material is a mass ratio of 1:1 to 60:1.

Preferably, the aqueous solution is one component or a complex of more components of pure water, ammonium dihydrogen phosphate aqueous solution, ammonium polyphosphate aqueous solution, aqueous urea solution, sodium dihydrogen phosphate aqueous solution, potassium bicarbonate aqueous solution, sodium bicarbonate aqueous solution, sodium carbonate aqueous solution, potassium carbonate aqueous solution, sodium chloride aqueous solution, potassium chloride aqueous solution, ammonium bromide aqueous solution, ammonium sulfate aqueous solution, ammonium bisulfate aqueous solution, ammonium aluminum sulfate aqueous solution, sodium borate aqueous solution, potassium ferricyanide aqueous solution, lanthanum nitrate aqueous solution, lanthanum sulfate aqueous solution, lanthanum carbonate aqueous solution, lanthanum phosphate aqueous solution, cerium nitrate aqueous solution, cerium sulfate aqueous solution, cerium carbonate aqueous solution, cerium phosphate aqueous solution, yttrium nitrate aqueous solution, yttrium sulfate aqueous solution, yttrium carbonate aqueous solution and yttrium phosphate aqueous solution.

The above aqueous solution contains ingredients with fire extinguishing performance, which can greatly improve the fire extinguishing efficiency of the fire extinguishing agent.

Preferably, the solid hydrophobic material is one component or a complex of more components of fluorocarbon powder, hydrophobic silica powder, hydrophobic ceramic powder, hydrophobic metal oxide powder and hydrophobic insoluble salt powder.

The above solid hydrophobic material is a difficult-combustible or non-combustible substance, has the advantages of high hydrophobic performance and large specific surface area, and can achieve efficient hydrophobic performance without reducing the fire extinguishing performance of the fire extinguishing agent.

Preferably, a mass concentration of the aqueous solution is 5%-60%, and the specific surface area of the solid hydrophobic material is 100-400 $m^2/g$.

Another purpose of the present invention is to provide a preparation method of the cooling type dry powder fire extinguishing agent, comprising: taking compressed gas as a power source, pre-mixing the aqueous solution and the solid hydrophobic material at first by a premixer in proportion at a certain flow rate, then dispersing and mixing by a static mixer, and finally forming the cooling type dry powder fire extinguishing agent.

Preferably, the premixer is one of a supersonic jet mixer and a Venturi jet mixer.

Preferably, the static mixer is one or a combination of more of an SV type static mixer, an SK type static mixer, an SX type static mixer, an SZ type static mixer, an SY type static mixer, an SH type static mixer, an SL type static mixer and an SD type static mixer.

Preferably, the content of a liquid water solution not wrapped by the solid hydrophobic material in the cooling type dry powder fire extinguishing agent is not higher than 10%.

Preferably, the flow rate is 100-800 mL/s.

Another purpose of the present invention is to provide an application of the above cooling type dry powder fire extinguishing agent in fire extinguishing of a battery, and the battery comprises: a lithium battery, a zinc-manganese battery, a nickel-metal hydride battery, a fuel cell, a zinc-air battery or a nickel-cadmium battery.

According to the above technical solution, compared with the prior art, the present invention has the following beneficial effects:
(1) The dry powder fire extinguishing agent prepared by the present invention is in a solid powder state macroscopically, without continuous aqueous solution, which solves the problem of electrical conductivity of the traditional water-based fire extinguishing agent;
(2) The micro-particles of the dry powder fire extinguishing agent prepared by the present invention are liquid water solutions, which are volatile under high temperature conditions, thereby realizing a rapid cooling function;
(3) The preparation method of the dry powder fire extinguishing agent of the present invention is field real-time preparation, the aqueous solution and the solid hydrophobic material are stored separately, and the dry powder fire extinguishing agent is formed in real time only during fire extinguishing, which can solve the problem that the fire extinguishing agent is unstable and difficult to be stored for a long time;
(4) The preparation method of the dry powder fire extinguishing agent of the present invention takes the compressed air as the power source without an additional electric device, and is faster and more efficient than the traditional mechanical stirring method, and a use method is similar to that of the traditional fire extinguisher, and easy to be popularized and used.

DETAILED DESCRIPTION

Technical solutions in the embodiments of the present invention are described clearly and fully below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Firstly, an ammonium dihydrogen phosphate aqueous solution with a concentration of 30% was prepared and placed in a liquid storage tank; and hydrophobic silica with a specific surface area of 200 m$^2$/g was used as a solid hydrophobic material and placed in a powder storage tank. Compressed nitrogen was used as a power source to transfer the ammonium dihydrogen phosphate aqueous solution and the hydrophobic silica to a supersonic jet mixer with a mixing ratio of 12:1. Then, the mixed liquid passed through an SV type static mixer at a flow rate of 500 mL/s to obtain the cooling type dry powder fire extinguishing agent.

After tests, the content of liquid water not wrapped by the solid hydrophobic material in the powder fire extinguishing agent is 1%, and the particle size of powder particles D90 is 31 mm. The fire extinguishing agent is used to put out a 200 Ah lithium-ion battery which catches a fire by heating. Test results show that the open fire is extinguished within 5 s, and the battery does not reignite. Through a cup-burner test, the high-efficiency ultrafine powder fire extinguishing agent has a fire extinguishing concentration of 33 g/m$^{-3}$ for standard methane fires.

Embodiment 2

Firstly, an ammonium polyphosphate aqueous solution with a concentration of 10% was prepared and placed in a liquid storage tank; and fluorocarbon with a specific surface area of 100 m$^2$/g was used as a solid hydrophobic material and placed in a powder storage tank. Compressed nitrogen was used as a power source to transfer the ammonium polyphosphate aqueous solution and the fluorocarbon to a supersonic jet mixer with a mixing ratio of 10:1. Then, the mixed liquid passed through an SZ type static mixer at a flow rate of 400 mL/s to obtain the cooling type dry powder fire extinguishing agent.

After tests, the content of liquid water not wrapped by the solid hydrophobic material in the powder fire extinguishing agent is 0.5%, and the particle size of powder particles D90 is 28 mm. The fire extinguishing agent is used to put out a 200 Ah lithium-ion battery which catches a fire by heating. Test results show that the open fire is extinguished within 5 s, and the battery does not reignite. Through a cup-burner test, the high-efficiency ultrafine powder fire extinguishing agent has a fire extinguishing concentration of 30 g/m$^{-3}$ for standard methane fires.

Embodiment 3

Firstly, a lanthanum phosphate aqueous solution with a concentration of 11% was prepared and placed in a liquid storage tank; and hydrophobic insoluble salt (hydrophobic calcium carbonate) with a specific surface area of 98 m$^2$/g was used as a solid hydrophobic material and placed in a powder storage tank. Compressed nitrogen was used as a power source to transfer the lanthanum phosphate aqueous solution and the hydrophobic calcium carbonate to a Venturi jet mixer with a mixing ratio of 9:1. Then, the mixed liquid passed through an SH type static mixer at a flow rate of 600 mL/s to obtain the cooling type dry powder fire extinguishing agent.

After tests, the content of liquid water not wrapped by the solid hydrophobic material in the powder fire extinguishing agent is 2%, and the particle size of powder particles D90 is 30 mm. The fire extinguishing agent is used to put out a 200 Ah lithium-ion battery which catches a fire by heating. Test results show that the open fire is extinguished within 5 s, and the battery does not reignite. Through a cup-burner test, the high-efficiency ultrafine powder fire extinguishing agent has a fire extinguishing concentration of 39 g/m$^{-3}$ for standard methane fires.

Embodiment 4

Firstly, an aqueous urea solution with a concentration of 16% was prepared and placed in a liquid storage tank; and hydrophobic metal oxide (hydrophobic lanthanum oxide) with a specific surface area of 93 m$^2$/g was used as a solid hydrophobic material and placed in a powder storage tank. Compressed nitrogen was used as a power source to transfer the aqueous urea solution and the hydrophobic lanthanum oxide to a Venturi jet mixer with a mixing ratio of 12:1. Then, the mixed liquid passed through an SD type static mixer at a flow rate of 500 mL/s to obtain the cooling type dry powder fire extinguishing agent.

After tests, the content of liquid water not wrapped by the solid hydrophobic material in the powder fire extinguishing agent is 1%, and the particle size of powder particles D90 is 21 mm. The fire extinguishing agent is used to put out a 200 Ah lithium-ion battery which catches a fire by heating. Test results show that the open fire is extinguished within 5 s, and the battery does not reignite. Through a cup-burner test, the high-efficiency ultrafine powder fire extinguishing agent has a fire extinguishing concentration of 41 g/m$^{-3}$ for standard methane fires.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications made to these embodiments will be apparent to those skilled in the art. General principles defined herein can be realized in other embodiments without departing from the spirit or scope of the present invention. Therefore, the present invention will not be limited to these embodiments shown herein, but will conform to the widest scope consistent with the principles and novel features disclosed herein.

What is claimed is:

1. A preparation method of a cooling type dry powder fire extinguishing agent, comprising: taking compressed gas as a power source, pre-mixing an aqueous solution and a solid hydrophobic material at first by a premixer in proportion, then dispersing and mixing by a static mixer, and finally forming a cooling type dry powder fire extinguishing agent;
   wherein a mass ratio of the aqueous solution and the solid hydrophobic material is 1:1 to 60:1;
   the specific surface area of the solid hydrophobic material is 100-400 m2/g;
   the premixer is one of a supersonic jet mixer and a Venturi jet mixer;
   the static mixer is one or a combination of more of an SV type static mixer, an SK type static mixer, an SX type static mixer, an SZ type static mixer, an SY type static mixer, an SH type static mixer, an SL type static mixer and an SD type static mixer.

2. The preparation method of the cooling type dry powder fire extinguishing agent according to claim 1, wherein the aqueous solution is one component or a complex of more components of pure water, ammonium dihydrogen phosphate aqueous solution, ammonium polyphosphate aqueous solution, aqueous urea solution, sodium dihydrogen phosphate aqueous solution, potassium bicarbonate aqueous solution, sodium bicarbonate aqueous solution, sodium carbonate aqueous solution, potassium carbonate aqueous solution, sodium chloride aqueous solution, potassium chloride aqueous solution, ammonium bromide aqueous solution, ammonium sulfate aqueous solution, ammonium bisulfate aqueous solution, ammonium aluminum sulfate aqueous solution, sodium borate aqueous solution, potassium ferricyanide aqueous solution, lanthanum nitrate aqueous solution, lanthanum sulfate aqueous solution, lanthanum carbonate aqueous solution, lanthanum phosphate aqueous solution, cerium nitrate aqueous solution, cerium sulfate aqueous solution, cerium carbonate aqueous solution, cerium phosphate aqueous solution, yttrium nitrate aqueous solution, yttrium sulfate aqueous solution, yttrium carbonate aqueous solution and yttrium phosphate aqueous solution.

3. The preparation method of the cooling type dry powder fire extinguishing agent according to claim 1, wherein the solid hydrophobic material is one component or a complex of more components of fluorocarbon powder, hydrophobic silica powder, hydrophobic ceramic powder, hydrophobic metal oxide powder and hydrophobic insoluble salt powder.

4. The preparation method of the cooling type dry powder fire extinguishing agent according to claim 1, wherein the content of a liquid water solution not wrapped by the solid hydrophobic material in the cooling type dry powder fire extinguishing agent is not higher than 10%.

* * * * *